United States Patent [19]

Parker

[11] Patent Number: 4,875,535

[45] Date of Patent: Oct. 24, 1989

[54] VEHICLE DRIVE

[75] Inventor: Robert H. Parker, Esher, England

[73] Assignee: Autokraft Limited, Weybridge, England

[21] Appl. No.: 103,138

[22] Filed: Oct. 1, 1987

[30] Foreign Application Priority Data

Oct. 2, 1986 [GB] United Kingdom ................. 8623710

[51] Int. Cl.[4] ......................... B62D 11/02; A61G 5/04

[52] U.S. Cl. ...................................... 180/6.2; 180/907; 180/342; 74/191

[58] Field of Search ........................... 180/74, 6.2, 907; 74/191

[56] References Cited

U.S. PATENT DOCUMENTS

| | | | |
|---|---|---|---|
| 897,099 | 8/1908 | Hayward | 180/74 |
| 2,519,749 | 8/1950 | Edwards | 180/6.2 |
| 2,798,565 | 7/1957 | Rosenthal et al. | 180/74 |
| 3,123,173 | 3/1964 | Jacobs | 180/74 |
| 3,351,148 | 11/1967 | Solomon | 180/74 |
| 3,688,857 | 9/1972 | Miller | 180/6.5 |
| 3,814,199 | 6/1974 | Jones | 180/907 |

FOREIGN PATENT DOCUMENTS

| | | |
|---|---|---|
| 3131504 | 2/1983 | Fed. Rep. of Germany . |
| 1153691 | 3/1958 | France . |
| 2455886 | 5/1980 | France . |
| 649464 | 5/1985 | Switzerland . |

*Primary Examiner*—Charles A. Marmor
*Assistant Examiner*—Karin Tyson
*Attorney, Agent, or Firm*—William R. Hinds

[57] ABSTRACT

Apparatus for driving and steering an invalid chair, or other light wheeled vehicle, comprises a transverse drive transmission shaft (8) with end cones (9 and 10) which contact across the periphery respectively of each of a pair of road wheels (11 and 12). By transverse axial movement of the drive transmission shaft the contact diameter of the cones can be varied and thus the relative speed of the road wheels controlled for differential steering.

7 Claims, 4 Drawing Sheets

VEHICLE DRIVE

This invention relates to a vehicle drive which also provides for steering a light vehicle, especially an invalid chair but applicable also to passenger or light goods trolleys or carriers, for example on golf courses or in warehouse.

According to the invention apparatus for driving and steering a wheeled vehicle comprises an oppositely-directed pair of rotary friction-drive cones mounted to extend each respectively across the periphery of one of a pair of vehicle road wheels, means for transmitting drive to the cones in frictional driving contact each with the periphery of its respective road wheel, and steering means for simultaneously moving the cones in one axial direction or the other so as to control the cone diameter at which each respective cone contacts its road wheel and thus control the speed of either road wheel relative to the other.

In a preferred embodiment, the apparatus comprises a rotary drive transmission shaft which extends transversely between a pair of road wheels of the vehicle, a friction-drive cone on each end of the transverse drive shaft loaded to bear in frictional driving contact on the periphery of and drive the respective road wheel, manual steering means for moving the transverse drive shaft axially so as to control the cone-diameter at which the respective drive cone contacts its wheel and thus vary differentially the drive ratios between the drive cones and their wheels, and means permitting the transverse drive shaft and/or the cones to accommodate change in contact diameter of the cones on their wheels.

In a particularly advantageous construction, the apparatus is made as a unit or kit for attachment to an existing invalid chair which, with the addition of an electric motor and battery, can thus be converted into a powered chair.

The apparatus will usually be designed for driving road wheels with pneumatic tyres or resilient solid tyres and tyre resilience can be utilized in maintaining driving contact of the cones. This enables the means for maintaining drive-contact to be simply a linkage whereby the cones can be moved into out of contact, the linkage passing a dead-centre, non-return, condition (passing through a position of greatest pressure) as the cones are pressed into contact with the tyres.

To accommodate the effect on drive shaft alignment of change in contact diameter of the cones, their drive shaft or shafts may be journalled in a stirrup or cradle which rests in slotted brackets which permit the drive shaft or shafts to tilt and thus enable each cone to ride higher or lower across the periphery of its road wheel.

The steering means may comprise a hand lever upstanding, convenient to a driver's hand, from the forward end of a steering shaft of linkage extending rearwardly towards a driven pair of rear road wheels. In an invalid chair, the steering column may extend along an armrest and conveniently house the electrical connections for motor control from a switch on the hand lever.

From the rear end of the steering shaft a drop arm is connected by a ball-joint to a drag link ball-jointed to a steering arm fast on a drive-shaft stirrup or cradle. By turning the hand lever, left or right for instinctive steering, through a small angle, the cones are moved axially in the opposite sense to drive the outer wheel, for a left or right turn respectively, faster than the inner wheel and thus achieve differential speed steering.

The invention is illustrated, by way of example, on the accompanying drawings, in which.

Figure 1:
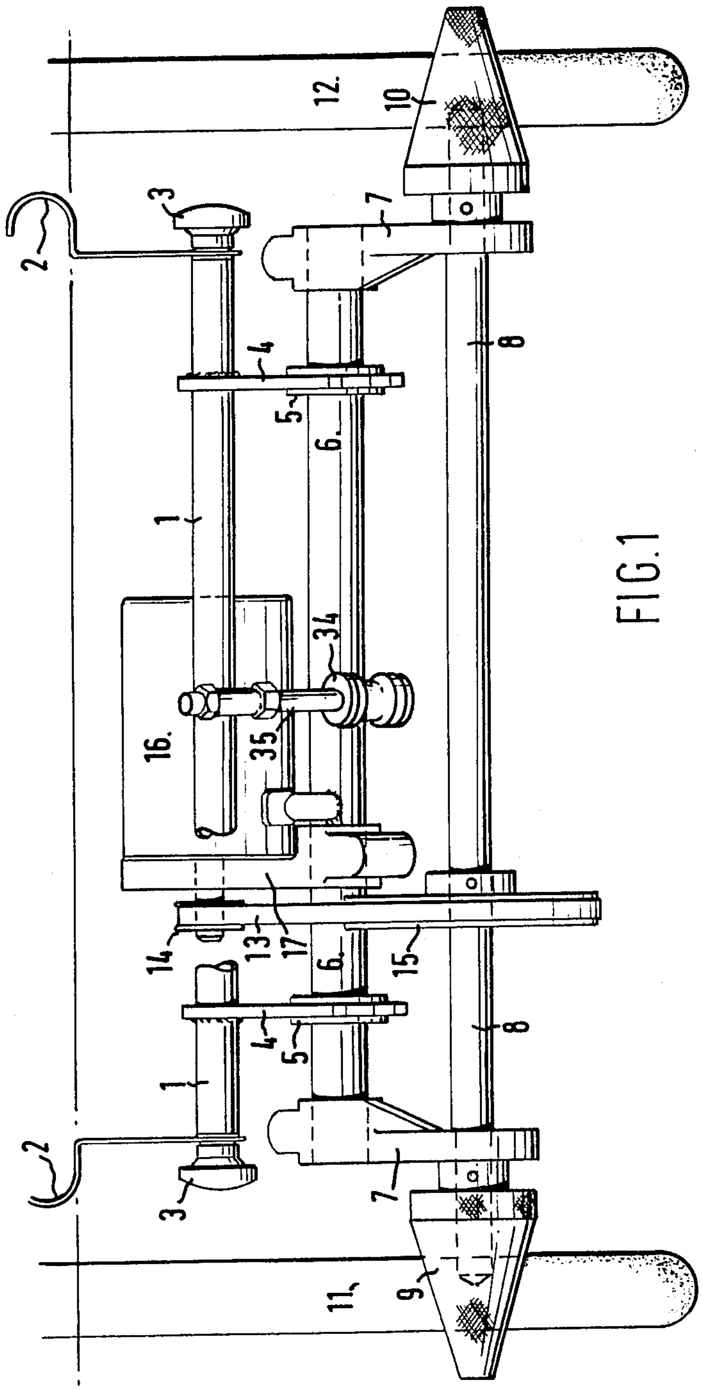
FIG. 1 is a plan of apparatus according to the invention for attachment to an existing invalid chair.

The apparatus shown by FIG. 1 has a transverse carrier bar 1 with a pair of clamping arms 2 held on the ends of the bar by stub end fittings with hand nuts 3 so that the arms 2 can be clasped firmly on to rear frame members of an invalid chair but leaving the bar 1 free to pivot on its own axis.

The bar 1 carries a pair of radial arm brackets 4 with slots in which rest slipper bearing pads 5 on a transverse stirrup bar 6 which is allowed to tilt by the pads 5 riding up or down in their slots and can also freely slide axially through and turn in the pads 5.

At the ends of the stirrup bar 6, a pair of radial arms 7 carry bearings in which is journalled a transverse drive transmission shaft 8 on the ends of which are keyed fast a pair of driving cones 9 and 10 which taper oppositely outwardly each across the periphery of a respective road wheel 11 or 12. The cones have ribbed or roughened surfaces to promote driving grip against the wheel tyres.

The shaft 8 is driven by a belt 13 and reduction driving and driven pulleys 14 and 15 from an electric motor 16 slung by a bearing bracket 17 from the stirrup bar 6 so as to move with that bar and maintain a constant relationship to the drive transmission shaft 8.

To steer the chair, the drive transmission shaft 8 is moved axially, transversely between the wheels 11 and 12, in the opposite direction to that in which a turn is to be made. This results in the outer wheel in a turn being driven faster, by a larger contact diameter of the respective cone, than the inner wheel so that differential speed steering is achieved.

Figure 2:
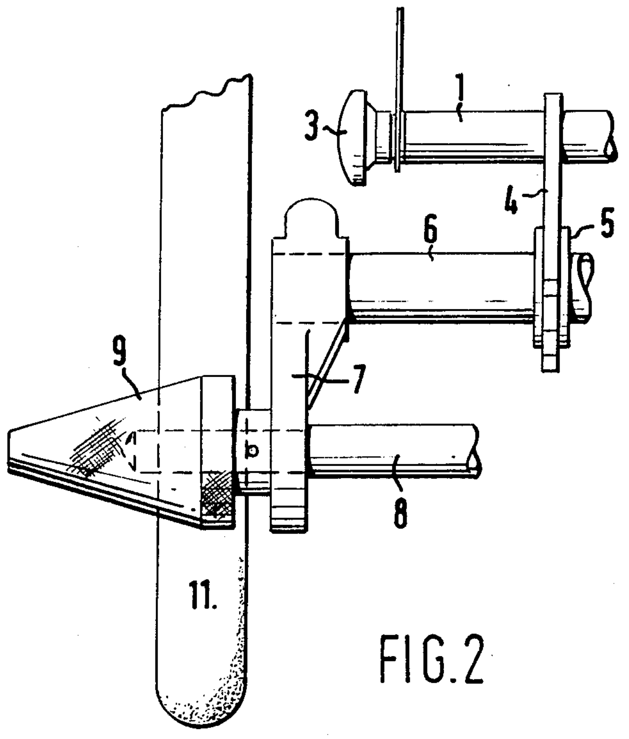
FIGS. 2 and 3 are fragmentary plan views showing the position of a driving cone on its road wheel for a full right turn and a full left turn respectively.

FIG. 2 shows the extreme left position of the cone 9 on the wheel 11 for a full right-hand turn in which the wheel 11 is the outer wheel.

Figure 3:
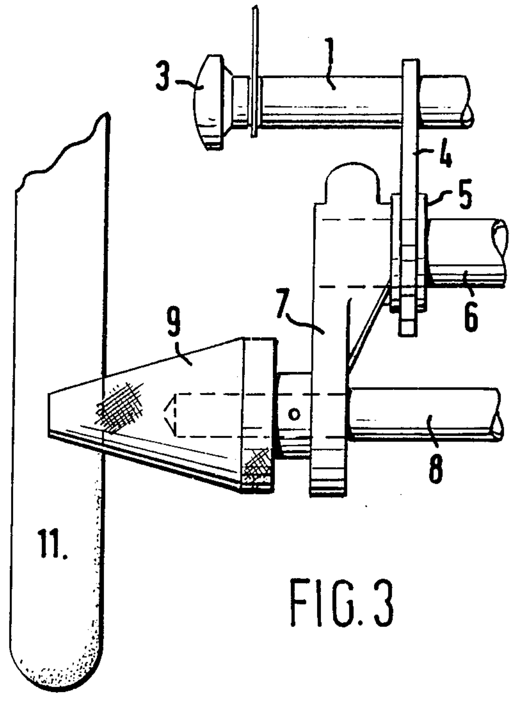

FIG. 3 shows the extreme right position of the cone 9 on the wheel 11 for a full left-hand turn in which the wheel 11 is the inner wheel.

Figure 4:
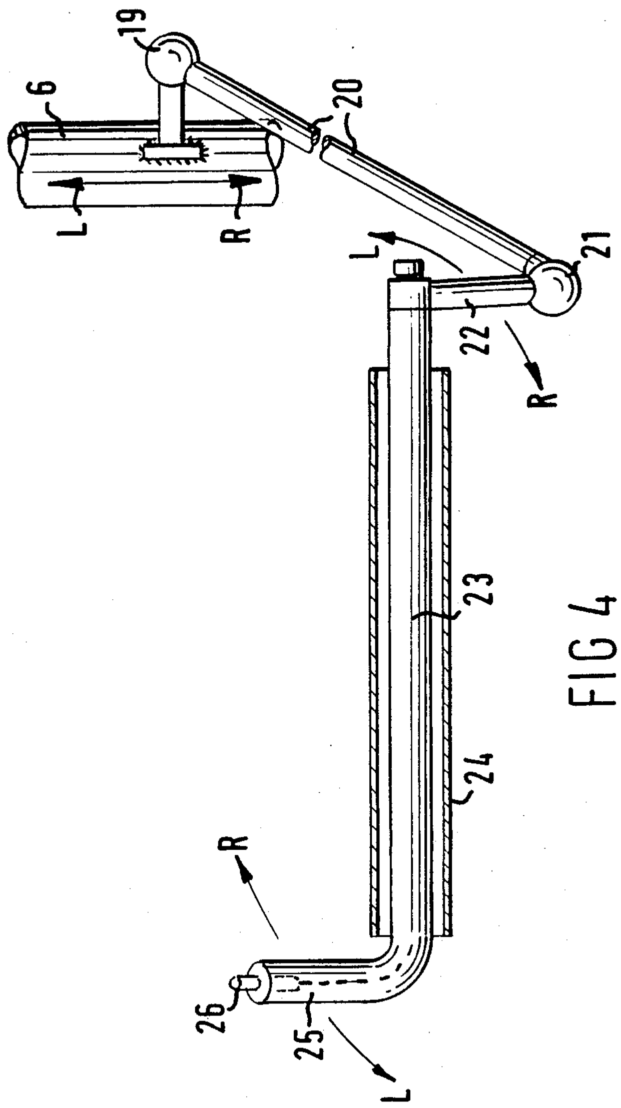
FIG. 4 is a schematic view of a steering linkage.

Steering movement of the shaft 8 is obtained by axial movement of the stirrup bar and, just as an example, a suitable steering linkage is schematically shown by FIG. 4.

At a suitable position on the stirrup bar 6, outside the range of sliding through the pads 5, a steering arm 18 is fixed to the bar 6 and has a ball-joint 19 to one end of a drag-link 20 of which the other end has a ball joint 21 to a drop arm 22 from the rear end of a steering shaft 23 in a steering column tube 24, extending along the arm rest of the chair, from a hand lever 25 upstanding conveniently to the occupants hand.

By turning the hand lever 25 towards L or R (left or right) through a small angle, the steering shaft 23 is rotated to turn the drop arm 22 and thus move, in the opposite sense, the stirrup bar 6, towards R or L and therewith the drive shaft 8.

The hand lever 25 may house an electrical switch control with an operating button 26.

As a result of axial movement of the driving cones for steering, the change in contact diameter of the cones on the wheels tilts the drive shaft 8 and this is permitted by tilting of the stirrup bar 6 carried by the bearing pads 5 in the slotted brackets 4.

For control of drive, the stirrup bar 6, with its arms 7, is rocked in the bearing pads 5 to press the cones on to the wheel tyres or move them away.

Figure 5:
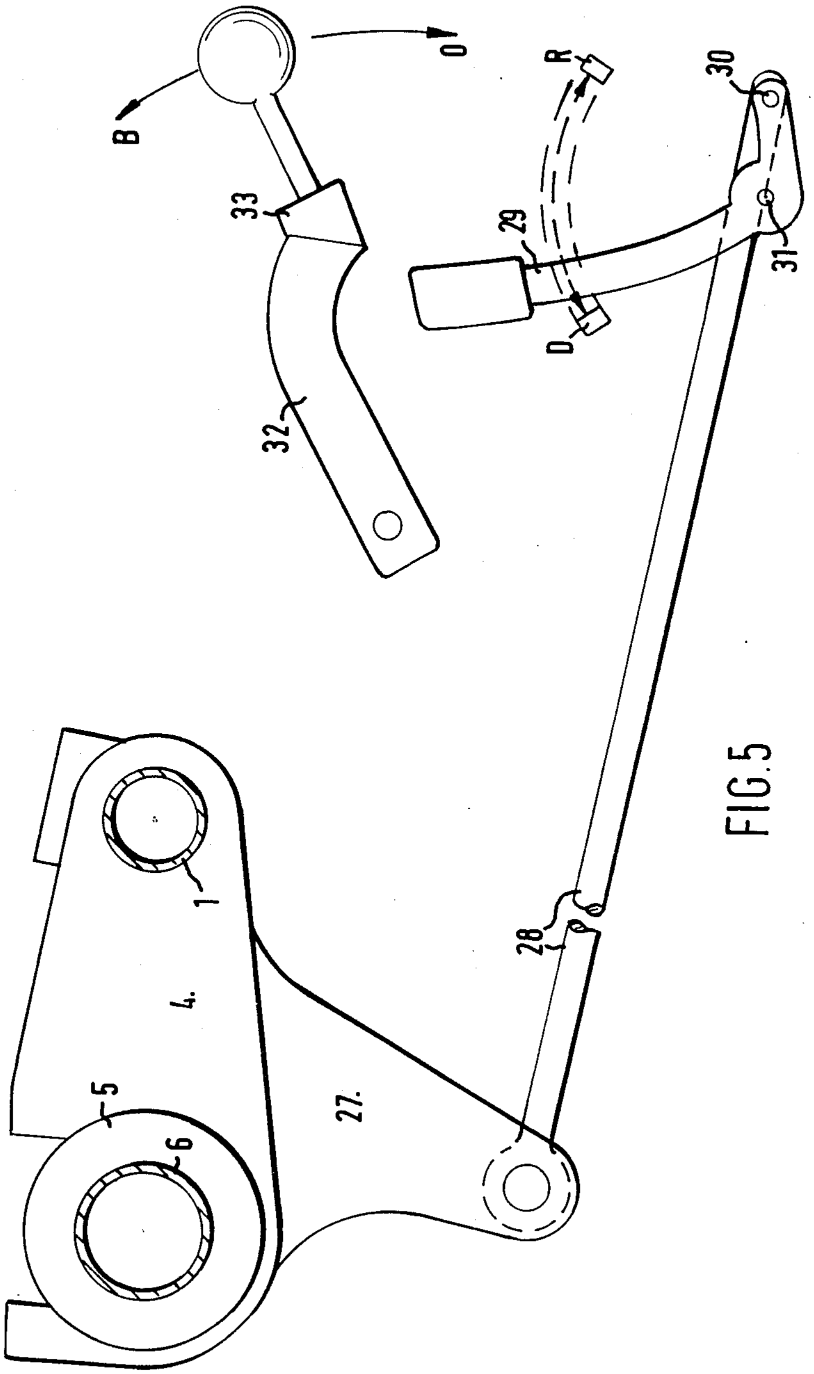
FIG. 5 is a fragmentary and schematic view of a lever control for moving the drive shaft and cones into and from drive contact with the road wheels.

FIG. 5 shows an example of a control lever arrangement for rocking the stirrup 6, 7.

One of the radial arm brackets 4 is extended downwardly as a lever 27 to which is connected an articulated pull rod 28 from a hand lever 29 pivoted as a bell crank.

Rearward movement (D) of the hand lever 29 pulls the rod 28 to rock the stirrup and thereby press the cones down on to the wheel tyres to engage the drive. At the end of this movement, the pivotal connection 30 of the hand lever and pull rod passes the dead-centre of the hand lever pivot 31 to relax the pull to an extent permitted by the resilient wheel tyres being indented by the cones and then recovering up to maintenance of resilient drive contact.

Forward movement (R) of the hand lever 29 releases the drive.

As a safety precaution, a hand brake lever 32 is arranged to cross the path of the drive hand lever 29 and has an abutment 33 which blocks drive-engaging movement of the lever 29 to D except when the brake lever 32 has been moved from its off position O to its brakes-on position B.

A keeper roller 34 is carried by an arm 35 from the carrier bar 1 to prevent escape of the stirrup bar 6 from the brackets 4.

I claim:

1. Apparatus for driving and steering a wheeled vehicle comprising an oppositely-directed pair of rotary friction-drive cones mounted to extend each respectively across the periphery of one of a pair of vehicle road wheels, means for transmitting drive to the cones in frictional driving contact each with the periphery of its respective road wheel, and steering means for simultaneously moving the cones in one axial direction or the other so as to control the cone diameter at which each respective cone contacts its road wheel and thus control the speed of either road wheel relative to the other.

2. Apparatus according to claim 1 mounted on a carrier for attachment as a kit or unit to an existing wheel chair.

3. Apparatus for driving and steering a wheeled vehicle comprising a rotary drive transmission shaft which extends transversely between a pair of road wheels of the vehicle, a friction-drive cone on each end of the transverse drive shaft loaded to bear in frictional driving contact on the periphery of and drive the respective road wheel, manual steering means for moving the transverse drive shaft axially so as to control the cone-diameter at which the respective drive cone contacts its wheel and thus vary differentially the drive ratios between the drive cones and their wheels, and means permitting the transverse drive shaft and/or the cones to accommodate change in contact diameter of the cones on their wheels.

4. Apparatus as claimed in claim 3, in which the cones can be moved into and out of contact with a resilient wheel tyre to engage or release the drive, the linkage being arranged to pass through a position of greatest pressure as the cones are pressed into contact with the tyres.

5. Apparatus for driving and steering a wheeled vehicle comprising a rotary drive transmission shaft which extends transversely between a pair of road wheels of the vehicle, a friction-drive cone on each end of the transverse drive shaft loaded in frictional driving contact to bear on the periphery of and drive the respective road wheel, manual steering means for moving the transverse drive shaft axially so as to control the cone diameter at which the respective drive cone contacts its wheel and thus vary differentially the drive ratios between the drive cones and their wheels, and means permitting the transverse drive shaft to accommodate change in contact diameter of the cones on their wheels, said means being a stirrup or cradle in which the drive shaft is journaled and which rests in slotted brackets which permit the drive shaft to tilt and thus enable each cone to ride higher or lower across the periphery of its road wheel.

6. Apparatus for driving and steering a wheeled vehicle comprising a rotary drive transmission shaft which extends transversely between a pair of road wheels of the vehicle, a friction-drive cone on each end of the transverse drive shaft loaded in frictional driving contact to bear on the periphery of and drive the respective road wheel, manual steering means for moving the transverse drive shaft axially so as to control the cone diameter at which the respective drive cone contacts its wheel and thus vary differentially the drive ratios between the drive cones and their wheels, and means permitting the transverse drive shaft and/or the cones to accommodate change in contact diameter of the cones on their wheels, said steering means comprising a hand lever to extend, convenient to a driver's hand, from the forward end of a steering shaft of linkage extending rearwardly toward said pair of road wheels, in which linkage a drop arm from the rear end of the steering shaft is connected to a drag link connected to a steering arm for moving the drive transmission shaft in the opposite sense to the hand lever.

7. Apparatus according to claim 6 wherein said vehicle is a wheel chair with an arm rest along which the steering shaft extends.

* * * * *